Oct. 25, 1938.  M. CHRISTENSEN ET AL  2,133,970
ELECTRODE AND METHOD OF MAKING SAME
Filed July 2, 1930  2 Sheets-Sheet 1
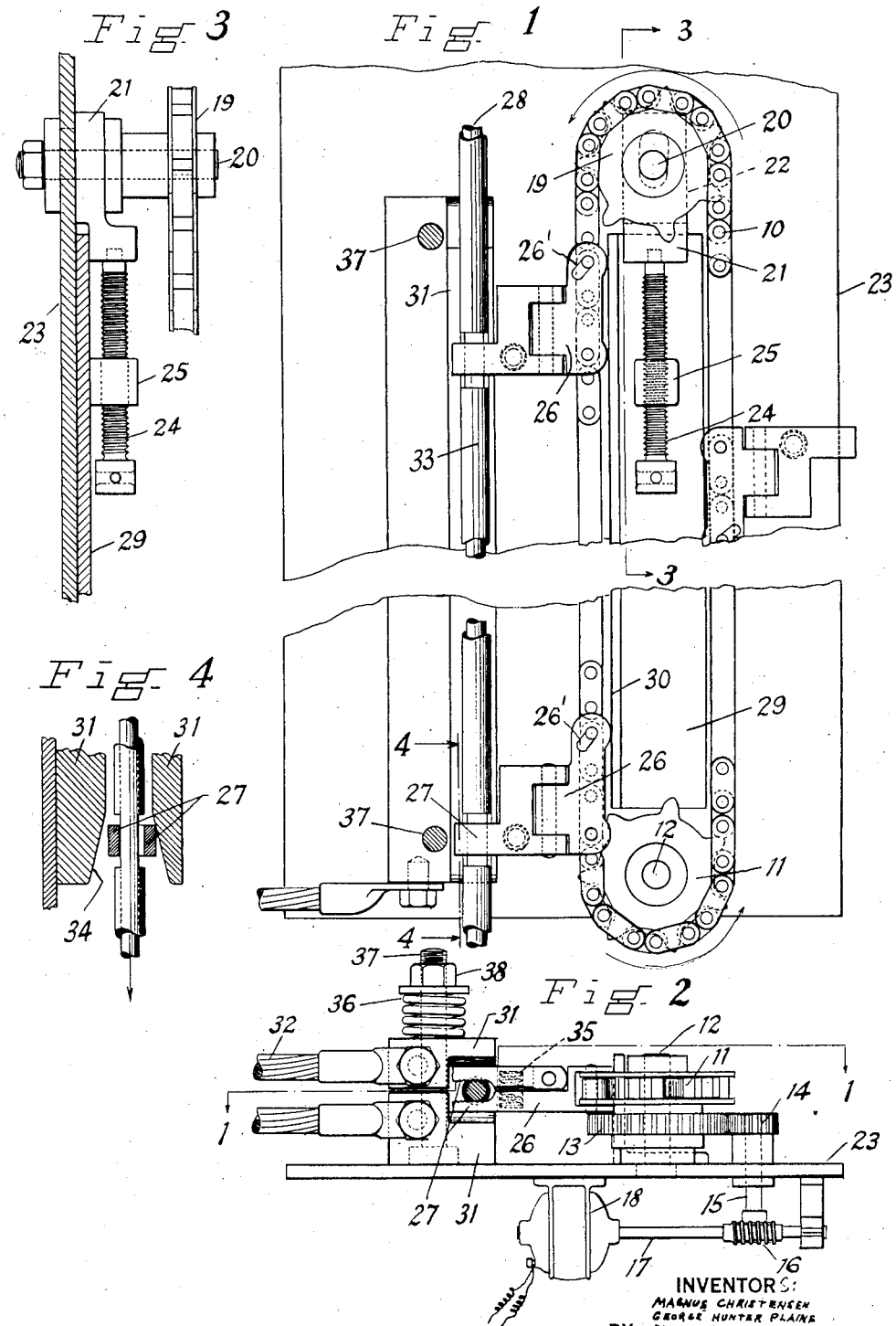

Oct. 25, 1938.  M. CHRISTENSEN ET AL  2,133,970
ELECTRODE AND METHOD OF MAKING SAME
Filed July 2, 1930  2 Sheets-Sheet 2
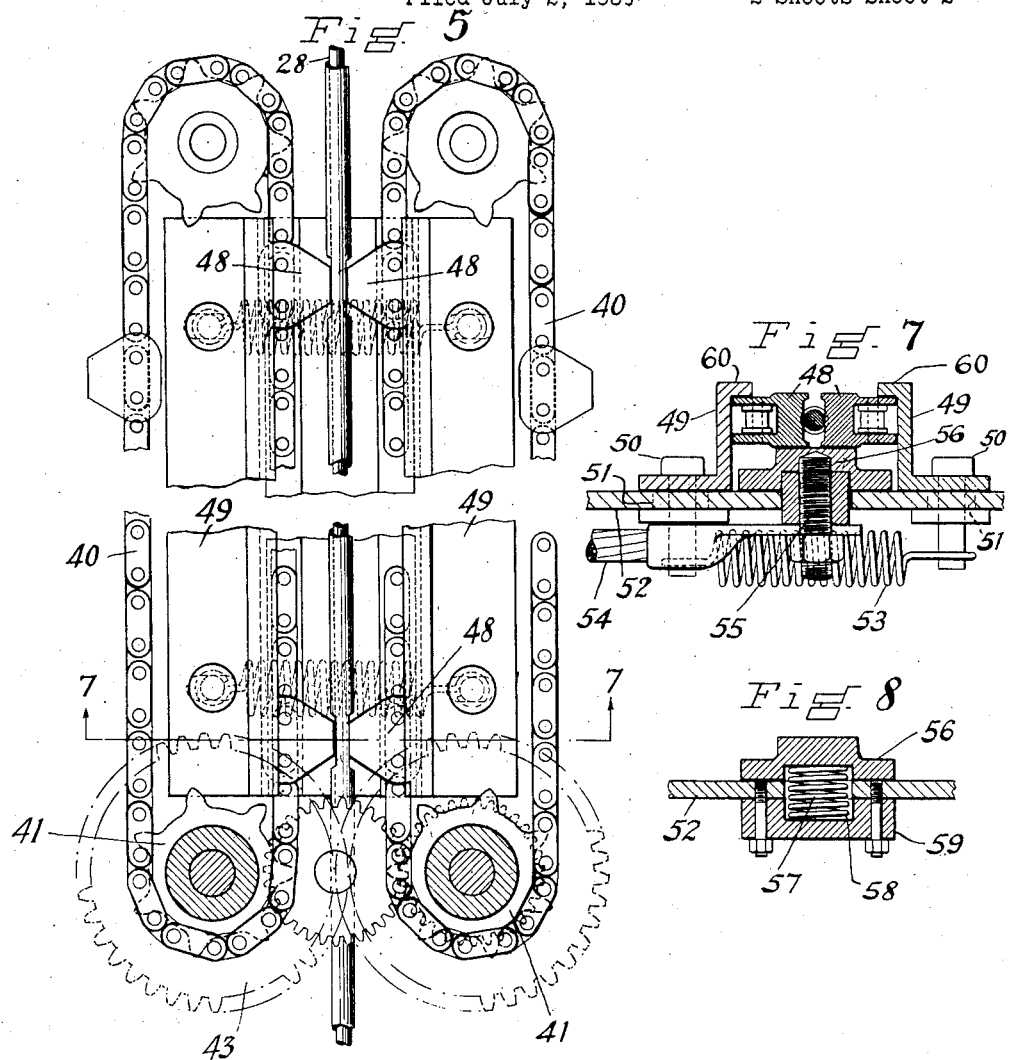
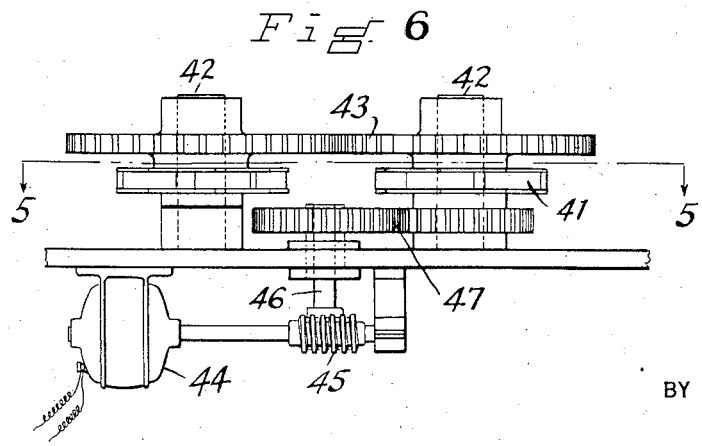
INVENTORS
MAGNUS CHRISTENSEN
GEORGE HUNTER PLAINE
JAMES EDWARD TRAINER
JAMES CAMPBELL HODGE
BY
ATTORNEY Patented Oct. 25, 1938

2,133,970

UNITED STATES PATENT OFFICE 2,133,970

ELECTRODE AND METHOD OF MAKING SAME

Magnus Christensen, George Hunter Plaine, James Edward Trainer, and James Campbell Hodge, Barberton, Ohio, assignors to The Babcock & Wilcox Company, Bayonne, N. J., a corporation of New Jersey Application July 2, 1930, Serial No. 465,348

8 Claims. (Cl. 219—8)

This invention relates to welding and more particularly to a method and apparatus for operating the movable electrode or welding rod employed in arc welding.

An object of this invention is to provide an improved mechanism for holding and feeding the movable electrode in an arc welding device.

A further object is to provide an improved method of arc welding permitting a continuous deposition of the welding metal.

These and other objects which will be apparent to those skilled in this particular art are accomplished by means of the invention illustrated in the accompanying drawings in which Fig. 1 is a view in elevation of an electrode feeding mechanism constructed in accordance with one embodiment of this invention, the view being partly in section on the line 1—1 of Fig. 2;

Fig. 2 is a bottom view of the arrangement shown in Fig. 1;

Fig. 3 is a transverse sectional view on the line 3—3 of Fig. 1;

Fig. 4 is a similar view on the line 4—4 of Fig. 1;

Fig. 5 is a view similar to Fig. 1 showing a modified arrangement of the electrode feeding mechanism partly in section on the line 5—5 of Fig. 6;

Fig. 6 is a bottom view of the arrangement shown in Fig. 5;

Fig. 7 is a transverse sectional view on the line 7—7 of Fig. 5; and

Fig. 8 is a view of a detail.

In arc welding, the welding rod forms one electrode of the arc and the metal of the rod is deposited in the joint being welded. As the rod is thus consumed it is fed longitudinally to compensate for the metal so deposited, and when the rod is entirely consumed a new one is substituted.

The particular embodiments of the present invention which have been chosen for the purposes of illustration are particularly useful in feeding long lengths of covered electrode, the covering of which is inadequate as a current conductor, although it will be apparent that the arrangement is equally useful in connection with other forms of electrodes or welding rods.

As illustrated in Figs. 1 to 4 the device includes an endless chain 10 or the like engaging a driving sprocket 11 on the shaft 12 provided with a driving gear 13 meshing with a spur gear 14 on a shaft 15 driven by a worm 16 on the shaft 17 of a driving motor 18. The upper end of the chain engages an idler sprocket 19 supported on a shaft 20 rotatably mounted in a movable bracket 21 positioned for vertical movement in a slot 22 in the supporting panel 23. An adjusting screw 24 threaded through a supporting lug 25 supports the bracket 21 in the desired position.

Spaced longitudinally along the chain 10 are a succession of combination electrode gripping jaws and contact shoes which are arranged to grip the associated electrode at predetermined points for feeding it toward the work and at the same time supplying the necessary current thereto. As illustrated, these devices comprise link members 26 secured to the chain at equally spaced intervals, each link member being provided with electrode gripping jaws 27, one of which is pivotally mounted on the other so as to be movable toward and from the other for gripping and releasing the electrode 28. A guide plate 29 has a face 30 for engaging the link members 26 and guiding the feeding movement thereof. The jaws 27 not only grip the electrode 28 but serve as contact shoes for supplying the welding current thereto. Current supplying bars or rails 31 are so positioned as to provide a slot through which the jaws 27 pass and in which they are pressed together by contact with the sides of the slot. Current is delivered to the rails through suitable conductors 32 and by the shoes 27 to the electrode 28. The rails 31 are yieldingly pressed together by springs 36 surrounding rail supporting bolts 37 and positioned between a holding nut 38 and the adjacent rail. The electrode 28 has a coating 33 which has been removed at equally spaced intervals, corresponding to the spaces between the gripping jaws to provide points of contact for the gripping jaws or shoes 27. Each link member 26 has a slotted connection 26' at one end to permit free movement thereof around the associated sprockets.

It will be apparent that operation of the motor 18 will cause a feeding movement of the chain and jaws 27, the latter gripping the electrode at those points where the coating is removed. Any desired number of gripping jaws may be employed, they being equally spaced longitudinally of the chain. As each pair of jaws comes into position the beveled upper ends 34 of the contact rails 31 press the jaws together, against the pressure of springs 35, causing them to yieldingly grip the electrode at an uncoated point, thus providing a path for the current from the rails to the electrode and at the same time feeding the latter downwardly at a predetermined rate governed by the speed of the driving motor 18. The lower ends of the rails 31 are flared or beveled to permit the rod to be released by the jaws 27 as they reach the end of their downward travel, at which time a succeeding set of jaws has moved into bar gripping position above, the release of the jaws at the lower end not occurring until the jaws at the top have securely gripped the rod.

In the form of the invention illustrated in Figs. 5 to 8, a pair of endless chains 40 are driven by sprockets 41 mounted on shafts 42 connected by gears 43 for simultaneous operation. A driving motor 44 having a worm 45 drives a stud shaft 46 connected by gearing 47 to one of the sprocket shafts 42. The chains 40 are located so that the inner runs of the chains are parallel and adjacent to one another. Combination contact shoes and electrode gripping jaws 48 are secured to each chain at predetermined equally spaced intervals and are so positioned that the jaws on one chain co-operate with the jaws on the other chain to grip the electrode between them as they move downward between presser plates 49 mounted on supporting studs 50 extending through the supporting panel 52. The studs 50 supporting one of the plates 49 extend through slots 51 in the panel 52 to permit relative movement of the plates 49 toward and away from each other. A spring 53 draws the movable presser plate 49 toward the other thus pressing the co-operating jaws 48 of each pair into gripping engagement with the electrode. Welding current is supplied to the electrode from the cable 54 which is connected by a stud bolt 55 with a contact rail or bar 56. The latter is spring-pressed inwardly against the shoes or jaws 48 by springs 57 engaging the side of the rail and mounted in pockets 58 formed in a supporting block 59 secured to the supporting panel. Each presser plate 49 has an outer flange 60 against which the jaws or shoes are pressed by the pressure of the contact rail 56.

In operation, the coating of the electrode is removed at equal intervals and movement of the chains causes each pair of jaws to grip the rod at the uncoated intervals and feed it downwardly as will be readily understood. The presser plates 49 maintain the jaws in gripping position and the electric rail 56 delivers the welding current to the jaws. Prior to the jaws reaching the lower end of the run, a new pair of jaws has been moved into position to grip the rod and continue the feed thereof after the pair of jaws at the lower end of the run has been separated and caused to release the rod by passing around the associated sprockets 41.

In either form of the device, the rate of feed of the rod can be determined and adjusted by regulating the speed of the driving motor. The regulation can be such that the feed of the rod will be uniform where the speed at which it is used up is uniform, and vice versa. In the same way, feed of the electrode can be proportioned to the longitudinal feed of the machine along the work or along the seam being welded.

It will be apparent that according to the method of welding disclosed herein where the outer end of the welding rod is left free it will be unnecessary to stop the welding operation for the purpose of inserting a fresh rod in the machine as the old rod is used up. The new rod can be welded directly to the end of the old independently of and without affecting the welding operation of the machine proper, and fed to the work continuously, or, if a flexible rod is employed a long length of it can be supplied from a reel or the like and fresh lengths welded to the ends of preceding lengths.

Although we have described certain features of the present invention in more or less detail it will be apparent that various changes, additions, omissions and substitutions can be made therein without departing from the spirit of this invention or the scope of the appended claims.

What we claim as new, and desire to secure by Letters Patent, is:

1. An electric welding bar having combustible covering of non-conducting material, the bar being bared intermediate the ends of the covering.

2. An electric welding bar having a covering of a combustible non-conducting material completely enclosing the bar, and having bared portions arranged at substantially equal intervals whereby contact may be made with the bar at different points throughout the length thereof.

3. A welding electrode comprising an elongated metallic core and a coating composed of material of inferior electrical conductivity, said coating being cut away at a plurality of predetermined spaced intervals to provide for successively disposing spaced contact members directly onto the metallic core within a predetermined distance of the melting end of the electrode as the electrode is consumed.

4. A welding electrode comprising an elongated metallic core of weld-forming material and a coating on the core composed of less conductive material than the core, said coating being notched on one side of the rod at predetermined spaced intervals to provide bare spaces on the core for successively contacting spaced current carriers directly in contact with the core within a predetermined distance of the melting end of the electrode as the electrode is consumed.

5. A welding electrode comprising a conducting core and a non-conducting covering therefor, portions of said covering being removed at points spaced apart along the length of the electrode to expose small areas of the conducting core whereby spaced points are provided for passing the welding current to the conducting core.

6. The method of making welding wire consisting of applying a coating of flux to a rod, then removing portions of the flux from a plurality of clearly defined zones therealong, to provide zones for electrical contact extending there along.

7. Fusion welding equipment including a metallic bar or wire, and a tubular sheath of material the physical characteristics of which are subject to change by heat, said material completely enclosing the bar or wire except at distributed spots at which the sheath is interrupted to permit the contact elements of electric current carriers to transmit electricity to the rod or wire during fusion welding operations.

8. A weldrod comprising a metal core and a coating of material the physical characteristics of which are subject to change upon the application of heat, the said metal core having a plurality of lineally spaced and entirely separate contact portions accessible through said coating to provide for electrical contact, the coating completely circumscribing said portions so as to constitute a substantially continuous flux sheath for the rod, uniform arc protection and a substantially uniform weld being promoted by the combination.

MAGNUS CHRISTENSEN.
GEORGE HUNTER PLAINE.
JAMES EDWARD TRAINER.
JAMES CAMPBELL HODGE.